Figure 1:
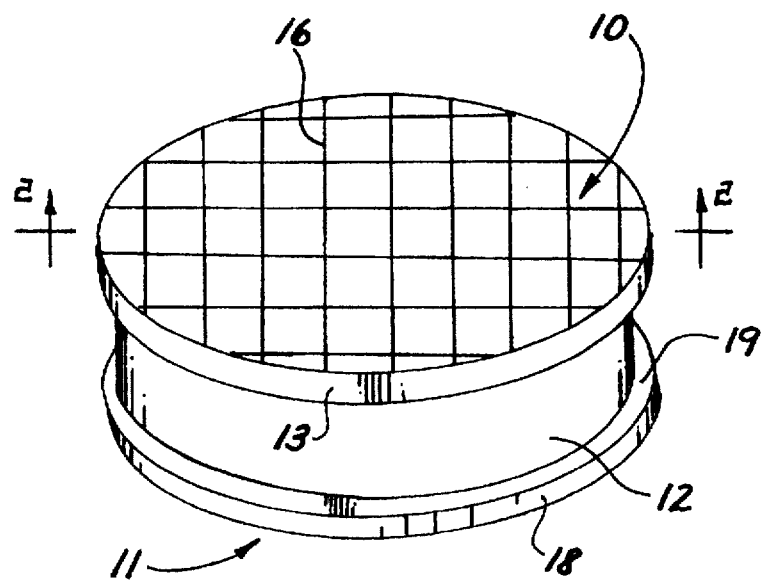

US005789008A

United States Patent [19]

Monte

[11] Patent Number: 5,789,008
[45] Date of Patent: Aug. 4, 1998

[54] ICE CREAM SANDWICH AND METHOD OF MAKING THE SAME

[75] Inventor: Woodrow C. Monte, Tempe, Ariz.

[73] Assignee: Neal B. Julien, Chandler, Ariz.

[21] Appl. No.: 595,035

[22] Filed: Jan. 31, 1996

[51] Int. Cl.$^6$ ....................................................... A23G 9/04
[52] U.S. Cl. ............................ 426/293; 426/95; 426/101;
426/139; 426/302; 426/549; 426/565
[58] Field of Search ................... 426/94, 95, 99,
426/101, 138, 139, 143, 283, 284, 291,
293, 302, 549, 565

[56] References Cited

U.S. PATENT DOCUMENTS

| | | | |
|---|---|---|---|
| 1,869,464 | 8/1932 | Clark | 426/95 |
| 1,899,511 | 2/1933 | Leaf | 426/95 |
| 1,950,734 | 3/1934 | Leaf | 426/95 |
| 2,167,353 | 7/1939 | Frediani | 426/95 |
| 2,521,403 | 9/1950 | Overland | 426/101 X |
| 3,377,171 | 4/1968 | Ryan et al. | 426/99 |
| 3,481,282 | 12/1969 | Reynolds | 426/293 X |
| 4,172,154 | 10/1979 | Von Rymon Lipinski | 426/549 |
| 4,915,971 | 4/1990 | Fennema et al. | 426/94 X |
| 5,130,150 | 7/1992 | Averbach | 426/94 X |

FOREIGN PATENT DOCUMENTS 947672  1/1964  United Kingdom ................. 426/139

*Primary Examiner*—Milton Cano

[57] ABSTRACT

An ice cream sandwich includes a layer of ice cream intermediate a pair of crispy cookies. The cookies resist migration of moisture from the ice cream and remain crisp during storage. An edible oil and food membrane on the cookies prevents moisture in the ice cream from being absorbed by the cookies.

17 Claims, 1 Drawing Sheet

ICE CREAM SANDWICH AND METHOD OF MAKING THE SAME

This invention relates to an ice cream sandwich and method for making the same.

More particularly, the invention relates to an ice cream sandwich cookie which maintains its crispness after being contacted by ice cream, which can withstand temperatures of 120 degrees F. to 130 degrees F. during shipment, and which complements the edible texture and flavor of an ice cream sandwich.

Conventional oblong or rectangular ice cream sandwiches comprise a slab of vanilla ice cream between a pair of rectangular chocolate cookies. The chocolate cookies absorb moisture from the ice cream and, as a result, the cookies become soft and moist and tend to stick to the fingers of a person holding and eating the ice cream sandwich. The migration of moisture from ice cream to the cookies is one reason that the crispy brown wafer "cookie" material used to make ice cream cones can not be utilized in an ice cream sandwich. The crispy wafer material would absorb moisture from the ice cream and become soft and mushy. The wafer material (or the ice cream) can be sealed by completely coating the wafer material with chocolate in order to block the migration of moisture from the ice cream to the wafer material. A chocolate coating is messy and tends to stick to the fingers of a person consuming the ice cream sandwich. Further, many individuals are either allergic to or simply do not like chocolate. And, many ice cream flavors do not combine favorably with chocolate. Another disadvantage of chocolate is that it tends to melt at temperatures in excess of 100 degrees F. During shipment to plants which manufacture ice cream sandwiches, wafers can encounter temperatures of 120 to 130 degrees F. Such temperatures cause many chocolate compositions to melt and, as a consequence, cause wafers coated with chocolate to stick to one another. In order to counter this problem, "high-temperature" chocolate compositions have been prepared which resist melting at high temperatures. However, many of these high temperature chocolate compositions can have an unfavorable waxy texture when frozen.

Another solution to the problem of moisture absorption is to saturate with oil the cookies in an ice cream sandwich. Saturating cookies with oil makes them sticky and gooey and can cause portions of the cookies to stick to the fingers of an individual consuming the ice cream sandwich.

Making an ice cream sandwich with chocolate cookies, wafer material, or other baked or cooked food compositions which are firm and crispy is advantageous because consumers like the combination of ice cream and crispy cookie materials. This is why ice cream cones are popular.

Another disadvantage of many wafer and cookie materials is that they are too weak to be utilized on machinery which produces an ice cream sandwich by injecting soft ice cream between a pair of spaced apart cookies and by then indexing the cookies to "wipe" excess ice cream off the nozzle which injected the ice cream.

Accordingly, it would be highly desirable to provide an improved ice cream sandwich which would include ice cream sandwiched between a pair of crispy crunchy cookies.

It would also be high desirable to provide a cookie which could be utilized for an ice cream sandwich and which would resist or prevent the migration of moisture from the ice cream into the cookie through the cookie—ice cream interface.

Further, it would be highly desirable to provide improved ice cream sandwich cookies of the type described which could be shipped at high temperatures without experiencing a degradation in quality and without adhering to one another, and which could be utilized on equipment which produces ice cream sandwiches at a high rate of speed by using a pair of cookies to receive soft ice cream and to then "wipe" the ice cream from the nozzle dispensing the ice cream.

Therefore, it is a principal object of the invention to provide an improved ice cream sandwich and method for producing the same.

A further object of the invention is to provide an ice cream sandwich including a slab of ice cream sandwiched intermediate a pair of crispy, crunchy cookies.

Another object of the invention is to provide a laminate cookie which can contact ice cream for an extended period of time without permitting moisture to migrate from the ice cream across the ice cream—cookie interface and into the cookie.

Still a further object of the invention is to provide a laminate cookie which includes a moisture barrier which resists degradation when the cookie is subjected to temperatures in the range of $-40$ degrees F. to 130 degrees F.

Yet another object of the invention is to provide an food laminate which can enhance the edibility and taste of an ice cream sandwich.

And, a further object of the invention is to provide an ice cream sandwich cookie which need not be saturated with oil to prevent the absorption of moisture by the cookie.

Figure 2:
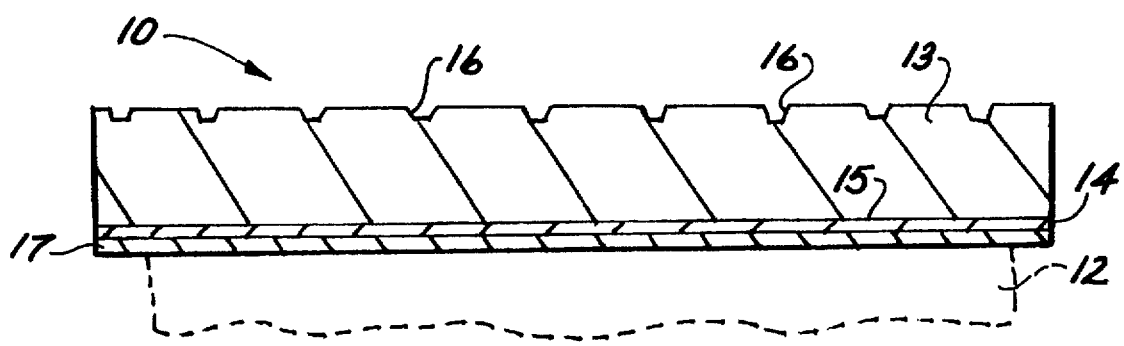

These and other, further and more specific objects and advantages of the invention will be apparent to those skilled in the art from the following detailed description thereof, taken in conjunction with the drawings, in which:

FIG. 1 is a perspective view of an ice cream sandwich constructed in accordance with the principles of the invention; and, FIG. 2 is a section view of a portion of the ice cream sandwich of FIG. 1 illustrating further structural details of the top cookie thereof and taken along section line 2—2 thereof.

Briefly, in accordance with my invention I provide an improved ice cream sandwich. The ice cream sandwich includes at least one layer of ice cream; at least one cookie having an inner support surface facing said layer of ice cream; an oil on said inner support surface; and, a membrane covering said oil and said inner support surface and comprised of an edible food, said membrane contacting said layer of ice cream. The oil is liquid at a temperature in the range of 65 to 140 degrees F. The cookie can be crispy.

In another embodiment of the invention, I provide an article of manufacture comprising a laminate for an ice cream sandwich. The ice cream sandwich includes ice cream contacting the laminate. The laminate includes a cookie having an inner support surface which faces the ice cream in said ice cream sandwich; a hydrophobic food substance on the inner support surface; and, a membrane covering the food substance and the inner support surface and comprised of an edible food.

In a further embodiment of the invention, I provide a method of producing a laminate for an ice cream sandwich. The ice cream sandwich includes ice cream contacting the laminate. The method includes the steps of providing a cookie having an inner support surface which faces and is adjacent said ice cream in said ice cream sandwich; and, contacting the support surface with a hydrophobic food substance and with a membrane comprised of an edible food.

The cookies utilized in the practice of the invention are presently preferably the rectangular chocolate cookies used in conventional ice cream sandwiches or are cookies made from the crispy brown wafer material which includes a grid pattern. The crispy brown wafer material (hereafter "wafer material") typically comprises the cone into which ice cream is dispensed, either from a soft serve machine or manually with a scoop. Some wafer material is light and quite porous. Other wafer material is heavier or denser; for example, the heavier denser dark brown wafer material which comprises the cone of a DRUM STICK (Trademark) ice cream cone. Either type of wafer material can be utilized in the practice of the invention. The cookies utilized in the invention can be baked or made from any desired edible food material other than the cookie materials described above. As utilized herein, the term cookie includes any small cake. Such cakes are usually, but not necessarily, sweet. A cake is any of a variety of breads which are baked or otherwise cooked.

In the automated "wipe" machines which produce an ice cream sandwich by injecting through a nozzle ice cream between a pair of spaced apart opposed cookies and by indexing the sandwich away from the nozzle so that one of the cookies "wipes" ice cream off the nozzle, when wafer material comprises the cookies, it is preferred that a heavier denser wafer material (like the wafer material in a DRUM STICK) be utilized to prevent the wafer from breaking.

While the cookies utilized in the ice cream sandwich of the invention can take on any desired shape and dimension, it is presently preferred that they be rectangular (like the chocolate cookies currently utilized in conventional ice cream sandwiches) or be circular.

If ice cream is dispensed between a pair of opposing rectangular cookies and the resulting ice cream sandwich is immediately eaten, then each cookie need not be particularly resistant to absorbing moisture from the ice cream which is contacting the cookie. If, however, ice cream is dispensed on one or more cookies and the resulting ice cream sandwich is stored frozen for a period of time prior to being eaten, then it is desirable that the cookies not absorb moisture from the ice cream in the sandwich.

I have discovered a food laminate which slows or prevents the migration of moisture from ice cream through the laminate—ice cream contact interface and into the laminate. The laminate includes a cookie, preferably (but not necessarily) a crispy crunchy cookie of the type described above. A liquid layer of an edible oil is sprayed or otherwise applied over the surface of the cookie which normally would contact the ice cream in an ice cream sandwich. The edible oil is preferably applied relatively uniformly over the entire surface of the cookie, or at least over the portion(s) of the surface of the cookie which would, if the oil were not applied, be contacted by the ice cream in the ice cream sandwich. After the oil is sprayed or otherwise spread onto the cookie a sheet of an edible membrane is pressed against the oil. The oil is preferably in liquid form, but may be semi-liquid—semi-solid or solid. As used herein, the term oil includes any of numerous edible hydrophobic mineral, vegetable, and synthetic substances, including animal and vegetable fats, that are generally slippery, viscous, liquid or liquefiable at or above room temperature (preferably at temperatures in excess of 95 degrees F.), soluble in various organic solvents (such as ether), but not soluble in water. Edible means suitable by nature for use as food for human beings. Examples of oils include, without limitation, milk butter, fractions of butter, high melting point fractions of butter, low melting point fractions of butter, olive oil, coconut oil, cocoa butter, CRISCO, corn oil, sunflower seed oil, chocolate including white chocolate, canola oil, hydrogenated and partially hydrogenated oils such as partially hydrogenated canola or soybean oil.

The membrane is preferably coextensive with the cookie surface, but should at least cover the area of the cookie surface which would be contacted by the ice cream in the ice cream sandwich if the oil and membrane were not applied to the cookie. When the membrane is pressed against the cookie, the oil helps the membrane adhere to the cookie. Most cookie surfaces are not extremely smooth. The conforming of the paper to high and low points on the cookie surface can also facilitate adherence of the membrane to the cookie. Food compositions other than oil can be utilized to adhere the membrane to the cookie.

The membrane can, if desired, be porous and absorb excess oil on the cookie. More than one layer of membrane can be utilized. The thickness of the membrane and of the membrane layer can vary as desired. Soft thin membranes with the consistency of soft, pliable tracing paper can be utilized as can thicker membranes having the thickness of twenty pound copy paper, of construction paper, or of various cardboards. The softness, porosity, absorbency, and pliability of the membrane can also vary. However, a thin, porous, pliable, soft membrane of rice starch paper is presently preferred. The rice starch paper absorbs excess oil from the cookie. Potato starch paper, paper made from pasta starch, paper made from the protein casein, or any other sheet of edible membrane can be utilized in the practice of the invention. The rice starch paper and other starch membranes noted above ordinarily are comprised substantially of starch, but include small amounts of protein, include binders, etc. Such membranes comprised of starch are readily available in commerce. The membrane utilized need not be porous as long as the oil or other food composition helps adhere the paper to the cookie surface.

The combination of hydrophobic oil and membrane is important. If only the oil is utilized, then high temperatures encountered during shipment of the laminate food of the invention can make the oil less viscous and cause it to be absorbed into the cookie. The membrane helps to retain the oil in the desired position adjacent and contacting the membrane, or, when the membrane is porous and/or absorbent, retains oil in the membrane. The membrane stabilizes the oil. The oil also stabilizes the membrane. One reason that it is preferable that the membrane be porous and/or absorbent and at least partially absorb oil is that the oil makes the membrane water resistant and helps prevent the starch in the membrane from absorbing water in ice cream contacting the ice cream. Ordinarily, at least portions of the membrane resist the migration of moisture from the ice cream into the cookie portion of the laminate food. Together, the hydrophobic oil and membrane form an effective barrier for significantly slowing or preventing the migration of moisture from ice cream contacting the paper. Flavoring, vitamins, minerals, trace elements, preservatives, and other components can, if desired, be added to the membrane, the oil, and the cookies used in the ice cream sandwich of the invention.

In an alternate embodiment of the invention, oil is applied to or absorbed into the membrane before the membrane is applied to the cookie. This procedure may be desirable because it reduces the number of applications which must be made on the surface of the cookie which will be adjacent the ice cream in an ice cream sandwich. The oil and membrane can be applied to any surface(s) or all surfaces of the cookie.

In still another embodiment of the invention, the oil and membrane are applied to the surface of a first cookie, after which a second cookie is applied over the membrane, to sandwich the edible membrane and oil between a pair of cookies. Additional quantities of oil or other food compositions can be utilized to secure the second cookie layer to the edible membrane. The second cookie ordinarily, but not necessarily, is coextensive with the first cookie and is the same size as the first cookie. The resulting food laminate includes the first cookie, an oil layer, at least one layer of edible membrane, a second oil layer, and the second cookie. In this embodiment of the invention, the second cookie layer directly contacts the ice cream in an ice cream sandwich. Moisture migrates from the ice cream sandwich into the second cookie, but the edible membrane—oil layers prevent the moisture from migrating into the first cookie.

In yet another embodiment of the invention, cookie batter is placed on a layer of edible membrane impregnated with oil. When the batter and paper are baked, the membrane adheres to the resulting cookie. Or, the membrane is adhered to the cookie after it is baked or cooked. Applying the membrane to a baked cookie while it is still warm facilitates the adhering of the membrane to the cookie.

The amount of oil applied to the surface of a cookie can vary as desired, but it is presently preferred that the amount of oil be minimized to insure that at least the outer portion of the cookie does not become saturated with oil and loose its crispy texture. The outer portion of the cookie is the portion which is not contacted by ice cream and which ordinarily is contacted by the fingers of an individual holding and eating an ice cream sandwich which includes the cookie. As noted in the Examples below, only a relatively small amount of oil ordinarily is required.

The following examples depict the presently preferred embodiments of the invention for the purpose of illustrating the practice thereof and not by way of limitation of the scope of the invention.

EXAMPLE 1

Waffle batter is prepared. The following ingredients are utilized:

1¾ cups sifted all-purpose flour 3 teaspoons baking powder

½ teaspoon salt 2 beaten egg yolks

1¾ cups milk

½ cup salad oil or melted shortening 2 stiffly beaten egg whites

The dry ingredients are sifted together. The yolks, milk and oil are combined and stirred into the dry ingredients. The whites are folded in, leaving a few fluffs. The resulting waffle batter makes three ten inch waffles.

EXAMPLE 2

A waffle iron is provided. The iron includes a lower flat circular metal griddle or plate surface and an upper hinged indented circular metal griddle or plate that impresses a grid pattern into waffle batter as it bakes. Each of the griddles is ten inches in diameter. The upper griddle is turned about its hinge to a position adjacent the lower griddle. The upper and lower griddle are heated to temperatures utilized to produce waffles from batter poured on the griddles. The upper heated griddle is turned about its hinge to a position spaced apart from the lower heated griddle. About one-third of the batter of Example 1 is poured on the lower griddle. The upper griddle is turned about its hinge to a position in which it contacts the batter and is near the lower griddle. The batter is cooked between the upper and lower griddles for several minutes or until the batter is cooked and a crispy brown waffle is produced. The upper griddle is then turned about its hinge away from the lower griddle and the cooked crispy waffle is removed. The cooked waffle has a lower flat surface and an upper surface which has grid pattern. The cooked waffle is about one-half inch thick.

EXAMPLE 3

A pair of circular waffle cookies 13, 18 (FIG. 1) about three and a half inches in diameter are cut from the waffle produced in Example 2. Each of the circular waffle cookies has a lower flat surface 15 and an upper surface which has a grid pattern 16.

Thin porous rice starch paper is obtained. The starch paper has a thickness comparable to that of tracing paper. Two circular pieces 17, 19 each having a diameter of about three and a half inches are cut from the rice paper.

An aerosol can of PAM cooking oil is provided. The aerosol can of PAM is distributed by American Home Food Products,Inc. of Madison, N.J. 07940. PAM cooking oil includes canola oil, grain alcohol from corn (added for clarity), lecithin from soybeans (prevents sticking), and propellant. A one second spray from the aerosol can of PAM covers a 10" skillet at 6 to 12 inches away. PAM cooking oil is 100% natural.

The aerosol can of PAM, the circular waffle cookies 13 and 18, and the circular pieces of edible rice starch paper 17 and 19 are utilized in the following manner to produce a pair of food laminates.

First, the aerosol can of PAM is held about six inches away from the lower substantially flat surface 15 of one 13 of the circular waffle cookies. The valve-nozzle of the aerosol can of PAM is manually operated to open the valve-nozzle for one second to cause PAM cooking oil spray to contact the lower flat surface 15 of the waffle cookie 13. A layer 14 of PAM oil is produced on the lower surface 15.

Second, a membrane comprising one of the circular pieces 17 of rice starch paper is pressed against the lower flat surface 15 of the waffle cookie 13. The PAM oil 14 on the lower surface causes the porous membrane 17 to adhere to the lower surface. The membrane 17 absorbs some of the PAM oil 14 from the lower surface of the cookies.

The foregoing two steps are utilized on the remaining waffle cookie 18 to produce a food laminate, i.e., the bottom flat surface of the remaining circular waffle cookie 18 is sprayed with PAM oil for one second, after which a membrane comprising the remaining circular piece of rice starch paper 19 is pressed against the lower flat surface of the remaining waffle cookie 18. The food laminate with the cookie 18 is substantially identical to the food laminate with the cookie 13.

After each of the waffle cookies has been treated with PAM oil and a membrane, a pair of food laminates 10 and 11 are produced. Each food laminate includes a waffle cookie 13 or 18, a layer 14 of PAM oil, and a membrane 17 or 19 of rice starch paper.

EXAMPLE 4

The pair of food laminates of Example 3 are stacked such that the membrane 17 on the bottom of the top food laminate 10 sets on, is in registry with, and contacts the top surface of the bottom laminate 11, i.e. the membrane 17 on the top food laminate 10 does not contact the membrane 19 on the bottom food laminate 11, but instead directly contacts the cookie 18 in the bottom food laminate 11.

The pair of stacked food laminates 10, 11 are placed in an oven and heated to 130 degrees F. for one hour. The food laminates are removed and cooled.

The top food laminate 10 is lifted from the bottom food laminate 11. Laminate 10 does not stick to laminate 11.

EXAMPLE 5

Example 4 is repeated, except that the stacked food laminates are left in the oven for twelve hours. Similar results are obtained. The top food laminate 10 does not stick to the bottom food laminate 11.

EXAMPLE 6

Example 4 is repeated, except that the stacked food laminates 10, 11 are left in the oven for forty-eight hours. Similar results are obtained. The top food laminate 10 does not stick to the bottom food laminate 11.

EXAMPLE 7

A three-quarter inch layer 12 of soft serve vanilla ice cream is dispensed between the food laminates 10 and 11 of Example 3 to form the ice cream sandwich illustrated in FIG. 1. The ice cream contacts only the membrane—lined surfaces of laminates 10 and 11. The circular spaced apart food laminates 10 and 11 are parallel to one another. The ice cream sandwich is stored in the freezer of a General Electric refrigerator for one month. After one month the sandwich is removed and the cookies 13 and 18 are evaluated for crispness. Cookies 13 and 18 are as crisp as they were prior to making and freezing the ice cream sandwich. Moisture from the ice cream has not penetrated the cookies 13 and 18, or, if moisture from the ice cream has penetrated the cookies 13 and 18, it is not noticeable and is negligible.

EXAMPLE 8

Example 7 is repeated, except that the cookies 13 and 18 from Example 3 are utilized without applying a layer of PAM oil and of membrane to each cookie. Consequently, the ice cream sandwich of Example 7 consists only of cookies 13 and 18 directly contacting the ice cream 12 without a barrier of PAM oil and rice starch paper intermediate ice cream 12 and cookies 13 and 18. After one month, the ice cream sandwich is removed from the freezer and the cookies 13, 18 are evaluated for crispness. Cookies 13 and 18 have absorbed moisture from ice cream 12 and are no longer crisp.

EXAMPLE 9

Examples 3 to 8 are repeated, except that olive oil and membranes comprised of thin sheets of potato starch paper are utilized in place of the PAM oil and of the membranes comprised of rice starch paper. Similar results are obtained.

EXAMPLE 10

Examples 3 to 8 are repeated, except that a one-quarter inch thick crispy crunchy chocolate cookies are utilized in place of each of the waffle cookies 13 and 18. Each of the pair of chocolate cookies is about three and a half inches in diameter. The chocolate cookies have a consistency similar in make-up to the round chocolate cookies used to make OREO brand chocolate cookies with the white filling. Similar results are obtained. In particular, in Example 7, the chocolate cookies are crisp after the ice cream sandwich is removed from the freezer after one month. In Example 8, the chocolate cookies are not crisp and have absorbed moisture from the ice cream in the ice cream sandwich.

EXAMPLE 11

Example 10 is repeated, except that membranes comprised of thin pasta starch paper are utilized in place of the rice starch paper membranes and corn oil is utilized in place of the PAM oil. Similar results are obtained.

EXAMPLE 12

Examples 1 to 8 are repeated, except that the waffles produced in Example 2 are each about 0.085 inch thick. Although the thickness of each waffle can vary as desired, it is presently preferred that the thickness of the waffles be in the range of about 0.07 inch to 0.10 inch.

EXAMPLE 13

Examples 1 to 8 are repeated, except that:

1. The waffles produced in Example 2 are each about 0.085 inch thick instead of one-half inch thick.
2. When the waffles produced in Example 2 are removed from the waffle iron they are moist and pliable and become crisp and rigid in about five to fifteen seconds.
3. Before the waffles produced in Example 2 become crisp and rigid, they are each turned around a separate conical metal mandrel to form a waffle cones for receiving ice cream. After each waffle cone becomes crisp and rigid it is removed from its mandrel.
4. In Example 3, conical food laminates are produced by spraying PAM oil against the inner conical surface of each of the waffle cones, and each piece of rice starch paper membrane is wrapped in a conical shape and inserted in one of the cones and pressed against the inner conical surface of the cone. Each piece of membrane adheres to the inner conical surface of one of the waffle cones. Consequently, in Example 3 a pair of PAM oil—membrane lined waffle cone laminates are produced instead of food laminates 10 and 11.
5. In Examples 4, 5, and 6, one waffle cone laminate is stacked inside the other waffle cone laminate such that the membrane in one cone laminate contacts the outer waffle surface of the other cone laminate. The stacked pair of waffle cone laminates is placed in the oven instead of the stacked food laminates 10 and 11. The results in Examples 4, 5, and 6 are similar, i.e., one cone laminate does not stick to the other cone laminate after the stacked cone laminates are heated in the oven at 130 degrees F. for one, twelve, and forty-eight hours, respectively.
6. In Example 7, each of the waffle cone laminates is filled with soft serve vanilla ice cream instead of dispensing the ice cream between laminates 10 and 11. The ice cream only contacts the membrane lined inner surface of each cone laminate. Each cone laminate comprises an ice cream sandwich because the ice cream in the cone is contacting at least one cookie laminate (i.e., a waffle cone lined with PAM oil—membrane) and/or because the ice cream is also intermediate a pair of opposing cookie laminate surfaces (i.e., the ice cream is between opposing sides of the cone). The results in Example 7 are similar, i.e., after the waffle cone laminates containing the vanilla ice cream are stored in the freezer of a refrigerator for one month, the waffle cone portions of the cone laminates are still crisp.
7. In Example 8, the waffle cones are utilized without applying a layer of PAM oil and of membrane to the inside of each cone. The results are similar, i.e., after being stored in the freezer for a month, the waffle cones have absorbed moisture and are no longer crisp.

The ingredients utilized to produce the cookies of the invention can vary widely as desired. Many recipes for producing cookies are well known in the art. For example, the ingredients of a powder mixture utilized to make sugar waffle cones include, in order of descending proportion, wheat flour, sugar, vegetable shortening (containing partially hydrogenated soybean oil), dextrose, whole egg, lecithin, and artificial flavoring.

Having described my invention in such terms as to enable those skilled in the art to understand and practice it, and having identified the presently preferred embodiments thereof,

I claim:

1. An ice cream sandwich comprising:
   at least one cookie having an inner support surface;
   a layer of edible oil on said support surface;
   a porous oil absorbent membrane covering said layer of edible oil and said inner support surface, comprising an edible food, said layer of edible oil being partially absorbed by said membrane; and
   at least one layer of ice cream contacting said membrane.

2. The ice cream sandwich of claim 1 wherein said oil is liquid at a temperature below 140 degrees F.

3. The ice cream sandwich of claim 1 wherein said oil is liquid at a temperature above 65 degrees F.

4. The ice cream sandwich of claim 1 wherein said cookie is crispy.

5. The ice cream sandwich of claim 1 wherein said membrane is thin and pliable.

6. The ice cream sandwich of claim 5 wherein said edible food is a starch.

7. The ice cream sandwich of claim 1 wherein said membrane is thin and pliable.

8. An article of manufacture comprising a laminate for an ice cream sandwich, said sandwich including ice cream sandwiched between and contacting each of a pair of said laminates, said laminate including
   (a) a cookie having an inner support surface which faces said ice cream in said ice cream sandwich;
   (b) a first amount of a hydrophobic food substance on said inner support surface; and,
   (c) a membrane covering said food substance and said inner support surface and comprised of edible food, said membrane contacting said hydrophobic food substance and including a second amount of said hydrophobic food substance absorbed into said membrane.

9. The article of manufacture of claim 8 wherein said membrane is substantially comprised of starch.

10. The article of manufacture of claim 8 wherein said membrane is soft, thin, and pliable.

11. The article of manufacture of claim 10 wherein said edible food is a starch.

12. The article of manufacture of claim 8 wherein said membrane is soft, thin, and pliable.

13. A method of producing a laminate for an ice cream sandwich, said sandwich including ice cream sandwiched between and contacting each of a pair of said laminates, said method including the steps of
   (a) providing a cookie having an inner support surface which faces and is adjacent said ice cream in said ice cream sandwich;
   (b) contacting said support surface with a
      (i) a first amount of a hydrophobic food substances and
      (ii) a membrane comprised of an edible food and including a second amount of said hydrophobic food substance absorbed into said membrane.

14. The method of claim 13 wherein said membrane is soft, thin, and pliable.

15. The method of claim 14 wherein said edible food is a starch.

16. The method of claim 13 wherein said membrane is soft, thin, and pliable.

17. The method of claim 13 wherein said hydrophobic food substance is an edible oil.

* * * * *